United States Patent

[11] 3,564,140

[72] Inventor Kunio Tanaka
Tokyo, Japan

[21] Appl. No. 672,186
[22] Filed Oct. 2, 1967
[45] Patented Feb. 16, 1971
[73] Assignee Nippon Electric Company Limited
Tokyo, Japan
[32] Priority Oct. 3, 1966
[33] Japan
[31] 41/64737

[54] PHASE DETECTION AND SYNCHRONIZING SYSTEM FOR FACSIMILE AND THE LIKE
15 Claims, 6 Drawing Figs.

[52] U.S. Cl. ........ 178/69.5
[51] Int. Cl. ........ H04n 1/36
[50] Field of Search ........ 178/69.5 (F)

[56] References Cited
UNITED STATES PATENTS

| | | | |
|---|---|---|---|
| 2,398,688 | 4/1946 | Artzt | 178/69.5F |
| 2,873,315 | 2/1959 | Fricks | 178/69.5F |
| 3,223,778 | 12/1965 | Stone et al. | 178/69.5F |
| 3,419,680 | 12/1968 | Brouwer et al. | 178/69.5 |

*Primary Examiner*—Robert L. Richardson
*Attorney*—Ostrolenk, Faber, Gerb and Soffen

ABSTRACT: An automatic phase detection and synchronizing means for phototelegraphy, or facsimile systems and the like in which phase signals are conventionally transmitted as amplitude modulated carrier signals in advance of facsimile signals. In order to determine whether phase signals are being transmitted, the instant invention provides a device for determining the presence of phase signals by developing signals representative of the phase signals and comparing them with incoming phase signals which have not undergone detection, for the purpose of automatically synchronizing the operation of the revolving drum employed in facsimile systems with the rotational rate dictated by the receipt of a group of noise free phase signals received from a remote transmitter.

INVENTOR.
KUNIO TANAKA
BY
OSTROLENK, FABER, GERB & SOFFEN
ATTORNEYS

INVENTOR.
KUNIO TANAKA
BY
OSTROLENK, FABER, GERB & SOFFEN
ATTORNEYS

INVENTOR.
KUNIO TANAKA

BY

OSTROLENK, FABER, GERB & SOFFEN

ATTORNEYS

PHASE DETECTION AND SYNCHRONIZING SYSTEM FOR FACSIMILE AND THE LIKE

The instant invention relates to facsimile systems and the like and more particularly to a novel system for automatically detecting the presence of phase signals in a facsimile signal and for automatically driving the revolving drum employed in such facsimile systems in synchronism with the phase signals transmitted from a remote location.

In the field of phototelegraphy, facsimile or the like, it is conventional to employ a receiver monitored by an attendant. The receiver is provided with a phase matching circuit having an operating button such that the attendant takes notice of received phase signals which are transmitted in advance of the facsimile or other signal and produced by the speaker and performs phase matching by depressing the phase button provided. In such systems it is further conventional to provide for a manual change over for the number of revolutions of the revolving drum employed in such facsimile systems in order to maintain synchronous communication with the transmitting end. With a view toward dispensing with the need for an attendant, automatic operation systems for a facsimile receiver have been proposed, which automatically discriminates and detects the presence of received phase signals and performs excellent phase matching. Inch systems should be provided with means for automatically determining at the receiving end whether the number of revolutions of the revolving drum at a remote transmitting location is large or small in order to change over the number of revolutions at the receiving end so as to be operating in synchronism. In the conventional systems, however, the phase signals are often incorrectly detected, causing undesirable and/or incorrect revolutions of the drum.

More specifically, the present invention is characterized by providing means for receiving phototelegraphy or facsimile signals which are in the form of an amplitude-modulated carrier signal thereby containing both phase and facsimile information, with the phase information being transmitted in advance of the facsimile information. The received signals are first amplified and limited and are then employed to generate a sawtooth waveform whose peak value is proportional to the pulse spacing duration. Further means are provided for triggering a monostable multivibrator into operation through a voltage comparator operation as the sawtooth waveform reaches a predetermined threshold level. The output pulses generated by the monostable multivibrator are then gated with incoming input phase signals which have undergone only demodulation to determine the presence of only desired phase signals in order to control the operation of a speed adjusting device. The speed selecting device initially operates a motor providing a sufficient time interval for the motor to reach the desired rotational speed and then for activating a clutch between the motor and the revolving drum employed in facsimile systems in order to lock the rotational speed of the revolving drum to the motor and hence cause the revolving drum at the receiver side to be operated in synchronism with the revolving drum at the sending location. The functional operation and apparatus employed at the sending location may be of the conventional type assuring complete compatibility of the present invention with existing systems, while at the same time providing the distinct advantage of automatic attendant-free operation.

It is therefore one object of the instant invention to provide a novel system for use with phototelegraphy or facsimile systems and the like which permits automatic phase signal detection and synchronization of the revolving drum employed at the receiver side of such facsimile systems with the revolving drum at the remote transmitting location.

Another object of the instant invention is to provide a novel automatic and hence attendant-free system for use with phototelegraphy or facsimile systems and the like wherein means are provided for detecting the presence of phase signals which are transmitted in advance of facsimile information, determining the phase repetition rate and generating pulses representative thereof and comparing the generated pulses with incoming phase signals to ascertain the operating speed of the revolving drum at the sending side in order to drive the revolving drum employed in the facsimile system at the receiving side in synchronism therewith.

Still another object of the instant invention is to provide a novel automatic and hence attendant-free system for use with phototelegraphy or facsimile systems and the like wherein means are provided for detecting the presence of phase signals which are transmitted in advance of facsimile information, determining the phase repetition rate and generating pulses representative thereof and comparing the generated pulses with incoming phase signals to ascertain the operating speed of the revolving drum at the sending side in order to drive the revolving drum employed in the facsimile system at the receiving side in synchronism therewith and wherein further means may be provided for determining desired changes in rotational speed at the transmitting location and appropriately adjusting rotational speed at the receiving side in accordance with such dictated changes.

These, as well as other objects, of the instant invention will become apparent when reading the accompanying description and drawings in which.

Figure 1:
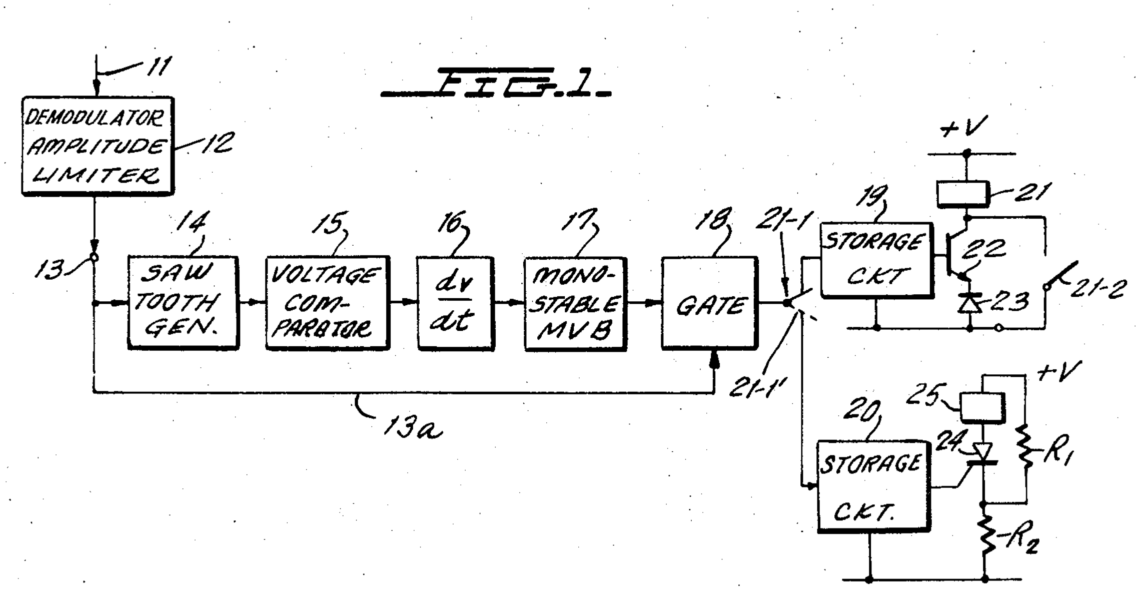
FIG. 1 shows a system, partially in block diagram form and partially in schematic diagram form, which is designed in accordance with the principles of the instant invention.

FIG. **5*a* is a schematic block diagram of the system of FIG. 1** showing the circuitry in greater detail.

Figures 5A, 5B:
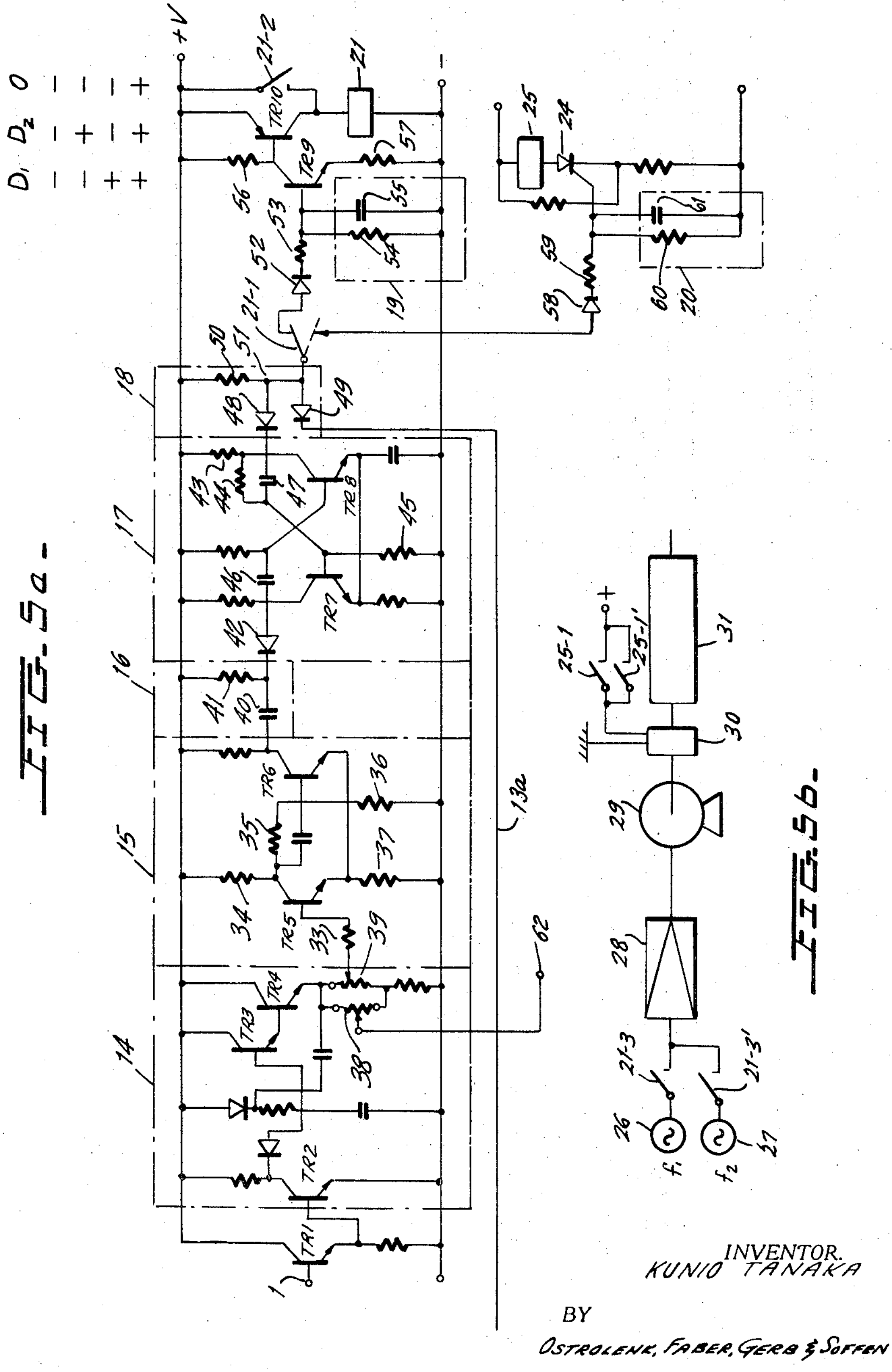

FIG. **5*b* is a simplified block diagram showing the facsimile equipment operated under control of the circuitry of FIG. 5*a***.

Figure 2:
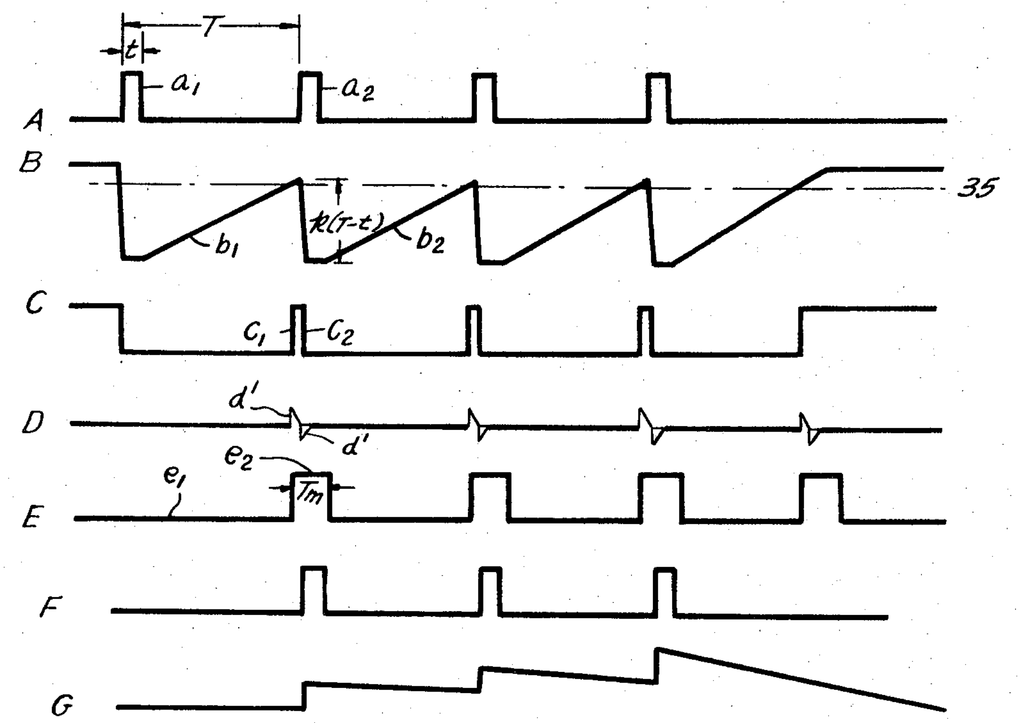
FIG. 2 shows a plurality of waveforms useful in explaining the operation of the invention shown in FIG. 1.

With respect to the drawings, it is to be noted that the signal processing circuit for the video proper components is totally omitted to simplify the illustration. Only the phase signal processing circuit is shown. Also, it is assumed that the phase signals are transmitted in the preparatory or the command-response stage for communication in advance of the actual transmission of the video components, and that the illustrated circuit components are operated in this preparatory stage to synchronize the receiver with the transmitter to enable accurate reception of the video signal. Referring to FIGS. 1 and 2, the received phase signal is detected by a demodulator-amplitude limiter circuit 12. The output of the demodulator-amplitude limiter 12 is as shown in FIG. 2A. This may include various undesirable signal components such as noise and those phase signals to be directed to other receivers. The following stages include sawtooth wave generator 14, voltage comparator 15, differentiating circuit 16, monostable multivibrator 17 and AND gate 18 which serve to reliably detect on the desired phase signal.

The output signals of demodulator amplitude limiter 12 (see also FIG. **2*a*) are applied simultaneously to a terminal 13 which, in turn, applies the pulses as input signals to a sawtooth generator 14 and a gate circuit 18**.

The sawtooth generator 14, which may, for example, be a Miller integrator or bootstrap circuit is caused to generate a sawtooth output signal (see FIG. **2*b*) whose crest or peak value is proportional to a pulse spacing duration. Such bootstrap circuits and Miller integrators are described in detail in the text "Pulse and Digital Circuits" by Millman and Taub, published by the McGraw-Hill Book Company, copyright 1956. The description of such circuitry can be found on pages 214—232, 246, 248, 351, and 487—491. For purposes of the present invention it is sufficient to understand that the sawtooth generator generates an output signal of a constant slope until a pulse is applied at its input terminal at which time the output of the sawtooth generator drops to zero or reference level, at which time the voltage level of the signal increases at a constant rate as shown by waveform B of FIG. 2. For example, considering pulse $a1$ of waveform A, as soon as this pulse is removed the output of the sawtooth generator generates a signal represented by the slope $b1$. The voltage of the output signal of circuit 14 continues to increase in a linear fashion until the next pulse $a2$ is generated, at which time the output signal of circuit 14** drops to reference level until pulse $a2$ is terminated, at which time the output signal increases in voltage level in a similar fashion, as shown by waveform portion (ramp) $b2$.

The output of the sawtooth generator 14 is applied to a voltage comparator circuit 15 which may, for example, be a Schmitt trigger circuit or a UJT (unijunction transistor) oscillator. Typical Schmitt trigger circuits are described in the aforementioned text on pages 164—172. The voltage comparator circuit 15 is set to operate after a predetermined threshold level (indicated by the phantom line 35 in waveform B of FIG. 2) is achieved by the input signal applied to voltage comparator 15 (i.e. the output waveform of sawtooth generator 14). When the input level of the signal applied to circuit 15 exceeds the threshold level, voltage comparator circuit 15 operates to produce a rectangular pulse, as shown by waveform C of FIG. 2, wherein the pulse width of the pulses developed is equal to the duration or time interval in which the signal applied to its input exceeds the threshold level 35. Considering waveform B, for example, it can be seen that the peak or crest of the sawtooth signal exceeds the threshold level for only very brief intervals, causing the pulses, as represented by waveform C, produced by voltage comparator circuit 15, to be quite narrow (i.e. of short time interval).

The output pulses developed by voltage comparator circuit 15 are applied to a differentiator circuit 16 which differentiates the output waveform of comparator circuit 15 to produce the positive-negative going pulses, as shown by waveform D of FIG. 2. Differentiator circuits are well known in the art and for purposes of the instant invention it is sufficient to understand that the positive spike $d1$ is generated as a result of the positive going portion of the pulse C1, for example, while the negative going spike $d1'$ results from the negative going portion C1′ of the pulse shown by waveform C.

The output of differentiator circuit 16 is applied to the input terminal of a monostable multivibrator circuit 17. Such circuits are described, for example, in the above-mentioned text on pages 174, 187—199 and 363—364. For purposes of the present invention, it is sufficient to understand that the monostable multivibrator circuit has a stable state causing the signal level of the output terminal to be represented by the line $e1$ of waveform E, shown in FIG. 2. As soon as the trigger input of the monostable multivibrator circuit receives an incoming positive spike, the multivibrator changes state rising to the level $e2$, at which level the output signal remains for a predetermined time interval ($T_m$) at which time it automatically resets itself to the ground or zero reference level so as to form a square pulse output. The pulse width $T_m$ of each of the pulses developed at the output of multivibrator circuit 17 is equal for all pulses and further is significant in providing successful operation for the device. The pulse width $T_m$ is related to the working voltage of comparator circuit 15. If the period of a phase signal is assumed to be T (see waveform A), the width of the phase signal is assumed to be $t$(both values in seconds), and if the slope of the sawtooth waveform is assumed to be $k$ ($V$/sec.), it has been found to be extremely advantageous to set the threshold level of comparator circuit 15 at $k\ (T-t)\ (V)$ and to set the operating duration $T_m$ of monostable multivibrator circuit 17 to be substantially equal to $t$.

The output of multivibrator circuit 17 is applied to one input of a gate circuit 18. Gate circuit 18 is preferably a logical AND gate having two input terminals, one receiving the output of monostable multivibrator 17 and the other receiving the output signal of circuit 12. The AND gate operates in such a manner that, upon the simultaneous presence of a pulse shown by waveform A and a pulse shown by waveform E, that an output pulse will be developed, as shown by the pulses of waveform F. Obviously, if the pulses shown by waveforms A and F do not overlap in time, gate circuit 18 will provide no output pulse. Thus, those undesirable components possibly appearing between pulses of waveform A are removed.

The output of gate circuit 18 is applied through a transfer contact 21–1, whose normal setting is shown in FIG. 1 in solid line fashion, to the input of a storage circuit 19. Storage circuit 19 is preferably comprised of at least one capacitor (to be shown in more detail subsequently) for storing the charge present as each pulse shown by waveform F is applied to the storage circuit input. The output signal is shown by waveform G of FIG. 2 and can be seen to be a staircase type voltage waveform. When the voltage level of the staircase waveform G exceeds the Zener voltage of the next circuit stage connected thereto, transistor 22 is turned ON establishing a current path through dioded 23 (whose Zener voltage level has been exceeded) transistor 22, and relay 21 to a suitable bias source +V. The Zener or breakdown voltage level will not be exceeded until a predetermined plurality of pulses shown by waveform F are applied to the input of storage circuit 19. Thus, even though the pulses of waveform F have the same pulse spacing, as the desired phase signal component transmitted by the sending end, the storage circuit 19 will not operate until several pulses in succession are received so as to prevent the possibility of misoperation. Thus, even though transient pulses or other incorrect signals are received at the receiver side, misoperation will not occur since receipt of a predetermined number of successive pulses is required before relay 21 can be energized.

Relay 21 is provided for initiating the operation of a synchronous motor (to be more fully described) which motor drives a revolvable drum normally employed in facsimile systems, at an angular velocity synchronous with a similar device at the transmitting end.

The operation of relay 21 causes closure of its normally open contact 21–2; causes the transfer contact 21–1 to move to the dotted line position 21–1′; and further causes closure of the normally open contact 21–3, shown in FIG. 5$b$, for an operation to be more fully described.

The operation of transfer contact 21–1 causes the pulses developed at the output of gate circuit 18 to be applied to the input of a second storage circuit 20 which is substantially identical in design and function to storage circuit 19. The function of storage circuit 20 is to provide a time lag sufficient to allow the motor for driving the revolving drum to reach and maintain the desired synchronous speed before the revolving drum is coupled thereto, in a manner to be more fully described.

The output of storage circuit 20 is coupled to circuitry comprised of a pair of series connected resistors $R_1$ and $R_2$ which form a voltage dividing circuit between the positive voltage level and ground or reference potential. The common terminal between resistors $R_1$ and $R_2$ is coupled to the cathode of a silicon controlled rectifier 24 which is normally maintained in the OFF condition. When the output voltage level of the signal developed by storage circuit 20 exceeds the bias voltage of silicon controlled rectifier 24, this voltage applied to the gate electrode of SCR 24 renders the SCR conductive, establishing a current path from reference potential through resistor $R_2$, SCR 24 and relay 25, to positive voltage V. Relay 25 operates contact 25–1 to activate a clutch 30, to be more fully described, for the purpose of coupling the revolving drum 31 to motor 29 so as to effect phase matching.

As was previously described, when a phase signal arrives, the circuitry of FIG. 1 automatically determines (through circuits 14—18) whether the signal being received is a phase signal or not. Once the incoming signal is identified as a phase signal, the circuitry drives motor 29 accordingly and subsequently performs the phase matching. The system may be enlarged to simultaneously and automatically determine the number of revolutions which the drum should revolve through an examination of the phase signals. This additional function may be carried out through the use of the modified circuit, shown in FIG. 3, wherein like elements designate like numerals. Whereas the circuits are substantially the same, it should be understood that different threshold levels will be set, as will be more fully described.

Figure 3:
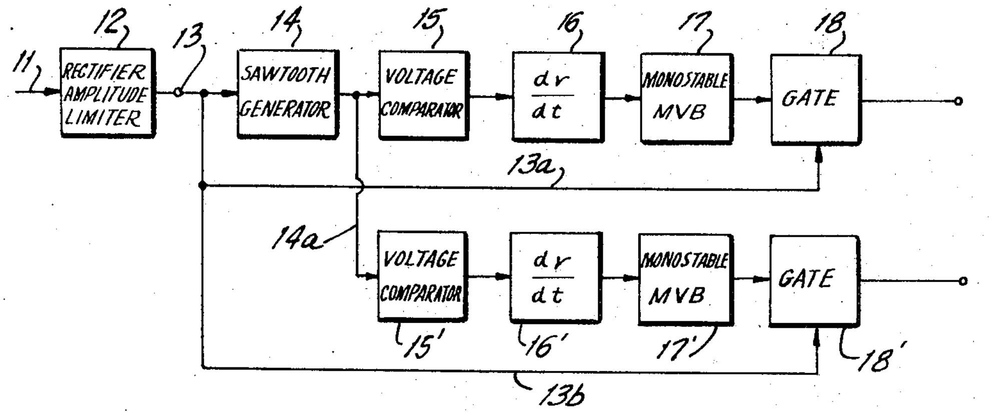
FIG. 3 is a block diagram showing another preferred embodiment of the instant invention.
Figure 4:
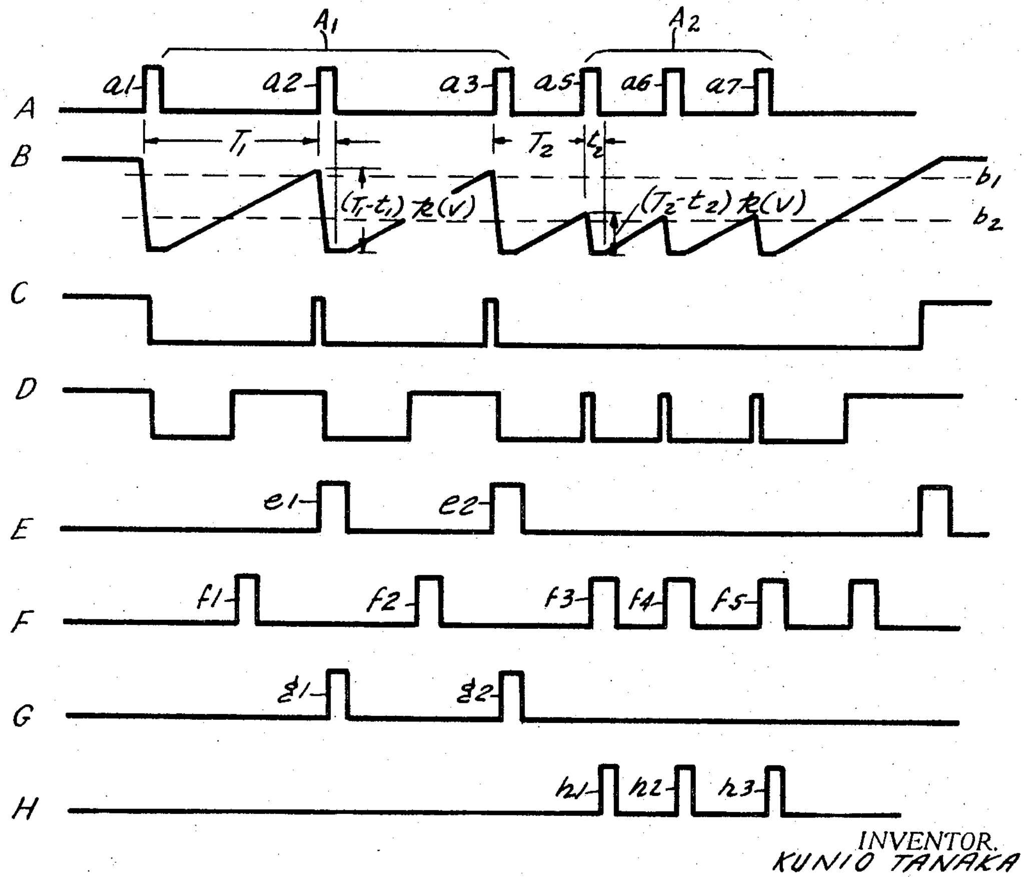
FIG. 4 shows a plurality of waveforms useful in explaining the operation of the embodiment of FIG. 3.

As shown in FIG. 3, circuits 15'—18' are connected in parallel with circuits 15—18 and derive the identical output signal from sawtooth generator 14 through lead 14*a*, that is applied to voltage comparator 15. In order to determine the revolving speed, the threshold levels of the voltage comparator circuits 15 and 15' should be set to satisfy the following relationship. Assuming the period of the phase signal, in the case of low speed operation, to be $T_1$ (seconds); the pulse width of the low speed phase signal to be $t_1$; the period of the phase signal representing high speed to be $T_2$ (seconds); the pulse width of the high speed phase signal to be $t_2$; and the slope of the sawtooth waveform (see waveform *b* of FIG. 4, for example) as *k V*/sec.; then the threshold level of comparator 15 should be set at $(T_1-t_1) \times k(V)$, while the threshold level of the voltage comparator circuit 15' should be set at $(T_2-t_2) \times k(V)$. FIG. 4 shows the waveform diagrams useful in explaining the operation of the system of FIG. 3.

Let it be assumed that a signal is applied to sawtooth generator circuit 14 comprised of square pulses, as shown by waveform A of FIG. 4. The pulses contained within bracket $A_1$ represents the low speed phase signals while the pulses contained within the bracket $A_2$ represents the high speed phase signals. The difference in periodicity of these signals have been exaggerated in waveform *a* for purposes of explanation, but it should be understood that in actual transmission low and high speed pulses are never transmitted in succession. As a practical matter, only one of the high and low speed is selected in the aforementioned preparatory stage.

In the same manner as was previously described, the pulses shown by waveform *a* are developed by circuit 12 and applied to sawtooth generator 14 which has a crest or peak value proportional to the time interval between pulses ($T_1$ for low speed phase signals and $T_2$ for high speed phase signals, for example).

When the voltage level of the output signal represented by waveform B and generated by circuit 14 exceeds the threshold level $(T_2-t_2) \times k(V)$, which is represented by the dashed line $b_2$, voltage comparator 15' is caused to operate. Likewise, when the voltage level of the signal shown by waveform *b* exceeds the threshold level $(T_1-t_1)\times k(V)$, which threshold level is represented by the dashed line $b_1$, voltage comparator circuit 15 likewise operate to cause the respective waveforms D and C to be generated at the outputs of circuits 15' and 15, respectively. It can clearly be seen that the pulse spacing between the pulses of waveform C and D are quite different. The pulses of waveforms C and D are then differentiated by circuits 16 and 16', respectively, to form pulses having the pulse shape as shown by waveform D of FIG. 2, which pulses have been omitted from FIG. 4 for purposes of simplicity. The pulses of the type shown by waveform D of FIG. 2 are then applied to their respective monostable multivibrator circuits 17 and 17', respectively, to generate signals represented by the waveforms E and F, respectively.

The time-relationship of the pulses represented by waveform E are compared with the phase signal applied to line 13*a*. The time-relationship of the pulses applied to the inputs of AND gate 18 is such that pulse $a_2$ occurs substantially in time-synchronism with pulse $e_1$ and pulse $a_3$ occurs substantially in time-synchronism with pulse $e_2$. The overlapping of these pulses will develop the output pulses $g_1$ and $g_2$, as shown by waveform G of FIG. 4.

In a like manner, the pulses developed by monostable multivibrator 17' are compared for their time-synchronism with the incoming phase signals applied through conductor 13*b* to one input of gate 18'. As can clearly be seen, pulses $f_1$ and $f_2$ do not occur in time-synchronism with any of the pulses shown in waveform *a*, however, pulses $f_3$, $f_4$ and $f_5$ occur in time-synchronism with phase pulses $a_5$, $a_6$ and $a_7$ causing the pulses $h_1$, $h_2$ and $h_3$, respectively, to appear at the output of AND gate circuit 18'.

In the case where low speed operation at the transmitting side is occurring, both monostable multivibrators 17 and 17' are caused to operate. However, at the time that the pulses appear at the output of monostable multivibrator 17', no phase signals occur in time-synchronism at the input. Therefore, AND gate 18' does not operate and only AND gate 18 operates to develop output pulses, as shown by waveform *g*.

In the case of high speed operation, when the output of sawtooth wave generator 14 reaches the threshold level $(T_2-t_2)$ $k($Vmore the voltage comparator 15' operates, followed by the operation of its associated monostable multivibrator 17'. Since the output of sawtooth generator circuit 14 does not reach the threshold level $(T_1-t_1)\ k(V)$, the voltage comparator 15 does not operate. However, the AND gate circuit 18' operates since the input phase signals are present in time-synchronism with the pulses developed by monostable multivibrator 17'. Thus, in the case of low speed operation, only AND gate 18 develops output pulses, while in the case of high speed operation, only AND gate 18' develops output pulses. Thus, by providing each of the parallel circuits 15—18 and 15'—18' with relay circuitry of the type shown by circuits 19—25, respectively, and by switching over the input of the synchronous motor with such relay circuits, it is therefore possible to automatically effect a changeover in the revolving speed of the drum 31 employed in facsimile systems and the like.

In the construction of the present invention, it is important to provide a sawtooth wave generator having good linearity and to provide appropriate threshold voltage settings for the voltage comparators. It has been found, however, that sufficient linearity can be obtained through the use of a bootstrap circuit when the time-spacing between impulses applied to the circuit is of the order of 500ms. It is also possible to set the threshold voltage levels in a simple and straightforward manner through the use of Schmitt circuits.

FIG. 5*a* shows a detailed schematic diagram of one preferred embodiment of the instant invention which automatically changesover the number of revolutions of the revolving drum through the use of a discriminating system of the type shown in FIG. 3.

Referring to FIG. 5*a*, the output of circuit 12 shown in FIGS. 1 and 3 is applied to the base electrode of an emitter follower connected transistor $TR_1$ which, in turn, is coupled to the input of sawtooth wave generator 14. Generator 14 is a bootstrap circuit comprising transistors $TR_2$, $TR_3$ and $TR_4$. A detailed description of the circuitry will not be given, however, its operation is substantially identical to the description previously set forth.

The output of the sawtooth wave generator (bootstrap circuit) 14 is coupled through a resistor 33 provided in Schmitt circuit 15, which is comprised of transistors $TR_5$ and $TR_6$. In operation, resistors 34, 35 and 36 form a voltage divider applying a voltage to the base of transistor $TR_6$ to turn it ON. This establishes a voltage drop across the emitter resistor 37 of transistor $TR_5$. As soon as the voltage applied to the base of transistor $TR_5$ is greater than the emitter resistance, transistor $TR_5$ will conduct, lowering the voltage at its collector terminal and hence lowering the voltage at the base of transistor $TR_6$, causing it to be turned OFF. Upon turn OFF, the voltage at its collector electrode rises toward the +V supply developing a voltage pulse which is maintained as long as the voltage at the base electrode of transistor $TR_5$ remains greater than its emitter voltage level.

The resistors 38 and 39 provided in sawtooth generator circuit 14 are adjustable resistors employed for the purpose of simply and easily setting the threshold voltage level for the Schmitt circuit 15.

The output pulses of Schmitt circuit 15 are applied to the differential circuit 16 which is comprised of a capacitor 40 and a resistor 41. The common terminal between elements 40 and 41 is connected through a diode 42 to one input terminal of monostable multivibrator 17' basically comprised of g transistors $TR_7$ and $TR_8$. In operation, the resistors 43, 44 and 45 connected in series form a voltage divider circuit, establishing a voltage level at the base electrode of transistor $TR_7$ causing it to be turned OFF. Its collector voltage will be near the value of the bias supply +V. This voltage level is applied through capacitor 46 of the base electrode of transistor $TR_8$ causing it to be turned ON so that its voltage level will be near ground or reference potential (minus). When a negative going pulse is applied to the input of diode 42, this pulse is transferred through capacitor 46 to the base electrode of transistor $TR_8$ causing it to be turned OFF and driving its collector voltage positive. This voltage is coupled through capacitor 47 to the base electrode of transistor $TR_7$ causing it to be turned ON. This state is maintained until the charge developed across capacitor 47 has discharged through resistor 45 at which time the monostable multivibrator will return to its initial state with transistors $TR_8$ and $TR_7$ being turned ON and turned OFF, respectively.

The collector electrode of transistor $TR_8$ is coupled to the cathode electrode of a diode 48 which, together with diode 49, forms the AND gate circuit 18. The anode electrodes of diodes 48 and 49 are coupled in common to one terminal of resistor 50 whose opposite terminal is coupled to the positive voltage source +V. The cathode of diode 49 is coupled through conductor 13*a* to the output signals developed by circuit 12, shown in FIG. 1, for example, The operation of the AND gate is such that when input signals applied to the respective cathode electrodes are simultaneously positive, then the voltage level at common terminal 51 will go positive. However, if either of the levels of signals applied to either of the two input terminals is negative, common terminal 51 will be at the negative level.

The output of AND gate circuit 18 is coupled through transfer contact 21–1 and a diode 52 and resistor 53 to the first storage circuit 19 comprised of parallel connected resistor and capacitor elements 54 and 55, respectively. The charge developed across the plates of capacitor 55 causes the staircase voltage waveform G of FIG. 2 to be developed at the base electrode of transistor $TR_9$. Resistors 56 and 57, in conjunction with the voltage applied to the base electrode of transistor $TR_9$ normally maintain the transistor conductive. However, at low voltage levels its collector voltage is close to the positive source +V maintaining transistor $TR_{10}$ in cutoff. As soon as the voltage at the base electrode of $TR_9$ reaches a predetermined level, the voltage at its collector terminal drops to a value sufficient to turn transistor $TR_{10}$ ON so as to energize relay 21. The energization of relay 21 closes its contact 21–2, locking relay 21 into the energized state.

Simultaneously therewith, relay 21 operates transfer contact 21–1 to the dotted line position shown in FIG. 5*a* so as to apply output pulses from gate circuit 18 through a diode 58 and resistor 59 to the second storage circuit 20 comprised of the parallel connected resistor and capacitor elements 60 and 61, respectively. The charge developed across the plates of capacitor 61 causes a staircase voltage to be applied to the gate electrode of silicon controlled rectifier 24, causing it to turn ON after a predetermined threshold level is achieved so as to energize relay 25.

FIG. 5*b* shows the motor control and drum revolving circuit operating under control of the circuitry of FIG. 5*a*.

It should further be noted (referring to FIG. 5*a* and FIG. 1) that when relay 21 operates, it also closes normally open contact 21–3 to connect an oscillator circuit 26 operating at a frequency $f_1$ to the input of power amplifier circuit 28. The output of power amplifier circuit 28 is applied to synchronous motor 29 which, prior to the operation of relay 25, is decoupled from revolving drum 31 through the clutch assembly 30. The closure of contact 21–3 allows motor 29 to reach the constant synchronous speed determined by the frequency rate of the power source 26. The relay 25 which operates after a predetermined delay, closes contact 25–1 providing power for clutch assembly 31, causing the clutch to engage so as to enable revolving drum 31 (normally used in facsimile systems) to be driven at the synchronous speed of motor 29.

In the case where it is desired to provide a changeover system so as to enable the revolving speed of drum 31 to be changed from low speed to high speed (or conversely from high speed to low speed) the adjustable arm of resistor 38 is coupled through a conductor 62 to the input of a circuit 15′ (see FIG. 3) which is further comprised of cascaded circuits 16′–18′ to form a circuit of the type shown in FIG. 3. It should be understood that the circuit design of circuits 15′–18′ may be substantially identical to the circuits 15–18, respectively, shown in FIG. 5, except that the threshold level for the Schmitt circuit and the reset timing for the monostable multivibrator will be altered in accordance with equations set forth previously. In a like manner, circuits substantially similar to the circuits and relays 19–25 are provided for the parallel circuits 15′–18′, respectively, to permit the changeover operation. For example, FIG. 5*b* shows a second oscillator 27 operating at a frequency $f_2$ for driving synchronous motor 29 at a second synchronous speed which may be higher (or lower) than the synchronous speed determined by oscillator 26. Oscillator 27 is connected to power amplifier 28 through a normally open contact 21–3′ which is operated by a relay (not shown) coupled to the parallel circuits 15′–18′ and substantially identical to relay 21, shown in FIG. 5*a*. The closure of this contact (when high speed or low speed phase signals are received relative to the speed determined by oscillator 26) connects the oscillator through power amplifier 28 to motor 29 allowing it to reach the synchronous speed determined by the frequency $f_2$ of oscillator 27. In a similar manner, a relay (not shown) substantially identical to relay 25 and under control of the parallel circuits 15′–18′ will operate after a predetermined time delay to close the normally open contact 15–1′ in order to engage clutch assembly 30 and couple revolving drum 31 to the output shaft of motor 29 a predetermined time period after motor 29 has reached synchronous speed.

Although the arrangement of FIG. 5*b* shows one preferred embodiment in which the number of revolutions is changedover by selectively switching one of the oscillators, it should be noted that a similar changeover can be effected by changingover the poles of the motor.

As still another modification, it should be noted that more than two circuits of the type shown by parallel circuits 15–18 and 15′–18′ may be provided if more than two changeover speeds are desired. For example, three or more such parallel circuits may be employed.

From the foregoing, it can be seen that the present invention provides a scheme which makes it possible to automatically detect the presence of phase signals employed in facsimile systems and the like and to discriminate under control of such phase signals what the revolution speed of the transmitting side is and thereby to automatically switch over the receiving side to the transmitting speed in order to bring ta transmitter and receiver locations into synchronism with one another.

Although there has been described a preferred embodiment of this novel invention, many variations and modifications will now be apparent to those skilled in the art. Therefore, this invention is to be limited, not by the specific disclosure herein, but only by the appending claims.

I claim:

1. An automatic phase detection system for use in phototelegraphy or facsimile telegraph systems and the like for performing phase matching of a revolving drum provided at the receiving end, with a similar drum at the sending end, wherein the signals transmitted from the sending end include phase signals of the amplitude-modulated carrier-type representative of facsimile drum rotational speed and transmitted in advance of facsimile information, said detection system being comprised of:

a first circuit for transforming the received signals into a sawtooth wave voltage whose crests are time-spaced proportional to the time interval between adjacent phase signals;

a voltage comparator circuit coupled to said first circuit for generating output pulses whenever the voltage level of the sawtooth waveform exceeds a predetermined threshold level;

a second circuit coupled to said comparator circuit for converting said output pulses to second output pulses of constant pulse width; and a third circuit coupled to said second circuit and to said transmitted signals for comparing said second output pulses with said input phase signals to generate final output pulses when said input phase signals and said second output pulses occur substantially in time synchronism.

2. The phase detection system of claim 1 further comprising fist normally deenergized relay means;

second normally deenergized relay means;

transfer means coupled to said third circuit and operated under control of said first relay means for normally connecting the output of said third circuit to said first relay means when said first relay means is deenergized;

said first relay means further comprising means coupled to said transfer means for energizing said first relay means when at least a predetermined number of final output pulses occur in succession so as to cause said first relay means, when energized, to operate said transfer means to couple said third circuit means to said second normally deenergized relay means;

said second relay means further comprising means coupled to said transfer means for energizing said second relay means after a predetermined number of final output pulses have occurred in succession.

3. The detection system of claim 2 further comprising:

a synchronous motor;

supply means for driving said synchronous motor at a predetermined synchronous speed;

normally open contact means coupled between said supply means and said synchronous motor and operative to close when said first relay means is energized to couple said supply means to said synchronous motor.

4. The detection device of claim 3 further comprising:

normally disengaged clutch means coupled between said synchronous motor and the revolving drum at said receiver side;

supply means for energizing said clutch means to become engaged;

third normally open contact means operated to close upon energization of said second relay means to thereby energize said clutch means and couple said receiver side revolving drum to said synchronous motor.

5. The phase detection system of claim 3 wherein the means for energizing said second relay is comprised of:

storage circuit means coupled to said third circuit means for transforming said final output pulses into a staircase waveform;

control circuit means coupled between said storage circuit means and said second relay means for energizing said second relay means when said staircase waveform reaches a predetermined threshold level, said predetermined threshold level being set to require the receipt of at least two final output pulses in succession for energizing said second relay means.

6. The detection system of claim 2 wherein the means for energizing said first relay means is comprised of storage circuit means for transforming said final output pulses into a staircase waveform;

circuit means coupled between said storage circuit means and said first relay means for energizing said first relay means when said staircase waveform reaches a predetermined threshold level, said threshold level being set so as to require the application of at least two final output pulses in succession to said storage circuit means.

7. The phase detection system of claim 6 wherein said third means is comprised of a differentiation circuit for differentiating the output pulses generated by said second means; and monostable multivibrator means coupled to said differentiation circuit for generating pulses of a predetermined constant pulse width.

8. The phase detection system of claim 6 further comprising: a synchronous motor;

switch means having an input coupled to said fourth means and first and second output terminals; said switch means being normally biased to couple its input to its first output terminal;

fifth means coupled to said first output terminal for energizing said synchronous motor;

said fifth means further comprising means for decoupling the first output terminal of said switch means from its input terminal and for coupling the second output terminal of said switch means to its input terminal when at least two output pulses in succession are developed by said fourth means;

normally disengaged clutch means connected between said synchronous motor and the revolving drum at said receiver end;

sixth means coupled to said second output terminal for engaging said clutch means when said fourth means applies at least two output pulses in succession to said sixth means and thereby providing sufficient time for said synchronous motor to reach synchronous speed before engaging the revolving drum at the receiver end with said synchronous motor.

9. An automatic phase detection system for use in phototelegraphy or facsimile telegraph systems and the like for performing phase matching of a revolving drum provided at the receiving end, with a similar drum at the sending end, wherein the transmitted signals include phase signals of the amplitude modulated carrier type transmitted in advance of facsimile information, said detection system being comprised of:

a first circuit for transforming the received signals into a sawtooth waveform whose crests are time-spaced proportional to the time interval between adjacent phase signals;

a pair of voltage comparator circuits each having their inputs coupled in common to said first circuit for generating output pulses whenever the voltage level of the sawtooth waveform exceeds predetermined threshold levels, each of said voltage comparator circuits having a different threshold level;

a pair of second circuits each being coupled to an associated one of said comparator circuits for converting associated output pulses to second output pulses of constant pulse widths of the output pulses generated by said voltage comparator circuits being different from one another;

a pair of third circuits each being coupled to an associated one of said second circuits and each being coupled in common to receive said transmitted signals for comparing their associated second output pulses with said input phase signal to selectively generate respective final output pulses when said input phase signals and at least one of said respective second output pulses occurs substantially in time synchronism, wherein only one of said respective second output pulses will occur in time synchronism with said input phase signals at any given instant.

10. An automatic phase detection system for use in phototelegraphy or facsimile telegraph systems and the like in which the sending end of the system transmits phase signals of the amplitude modulated carrier type to the receiving end in advance of facsimile information for controlling a revolving drum utilized in such facsimile systems to rotate in synchronism with a similar drum provided at the sending end, and said phase signals representing the operating speed of the facsimile system, said phase detection system being comprised of:

first means for converting signals received from the sending end into equal amplitude square pulses whose time-spacing is representative of said phase signals;

second means for transforming said square pulses into a sawtooth waveform whose crests are time-spaced by an amount proportional to the time interval between adjacent phase signals;

voltage comparator means for transforming said sawtooth waveform into pulses whenever said voltage level of said sawtooth waveform achieves a predetermined threshold level;

third means for transforming the output pulses of said second means into pulses of a predetermined constant pulse width; and fourth means for generating pulses whenever an incoming phase signal occurs substantially in time synchronism with an output pulse from said third means for indicating the present of a facsimile transmission.

11. A phase detection system of claim 10 wherein said second means is comprised of a bootstrap circuit.

12. The phase detection system of claim 11 wherein said second circuit means is comprised of a Schmitt circuit.

13. The phase detection system of claim 10 wherein said fourth means is an AND gate.

14. An automatic phase detection system for use in facsimile systems and the like wherein a revolving drum employed at the receiving end is driven in synchronism with a similar drum at the sending end, which sending drum may be operated at a plurality of different angular velocities and synchronous operation is brought about through the transmission of phase signals in advance of facsimile information, whereby the time-spacing of the phase signals is representative of the angular velocity of the sending end drum, said detection system being comprised of:

a first circuit for transforming received phase signals into a sawtooth waveform whose crests are time-spaced proportional to the time intervals between adjacent phase signals;

a plurality of second circuits each being connected in common to said first circuit for converting said sawtooth waveform into pulses whose time-spacings are proportional to the amplitudes of said crests;

a plurality of third circuits each being coupled to an associated second circuit for generating an output pulse when the respective output pulses received occur substantially in time synchronism with the incoming phase signals to thereby determine the operating speed of said sending end revolving drum, only one of said third circuits being capable of generating pulses at a given instant; and a plurality of fourth circuits each being coupled to an associated third circuit for rotating the receiving end drum at an angular velocity determined by the third circuit which is generating pulses.

15. The detection device of claim 14 further comprising:

a motor for driving the receiving side revolving drum;

a normally disengaged clutch assembly coupling said drum to said motor; and each of said fourth circuits including a fifth circuit for initially driving said motor at a speed dictated by the fourth circuit in operation; and a sixth circuit for engaging said clutch assembly after said motor reaches the desired speed.